US008646470B2

(12) United States Patent
Bajema et al.

(10) Patent No.: US 8,646,470 B2
(45) Date of Patent: Feb. 11, 2014

(54) COMPACT WASHING FLUME SYSTEM (75) Inventors: Rick Wendell Bajema, Plano, TX (US); Keith Robert Johnson, Blackdown (GB)

(73) Assignee: Frito-Lay North America, Inc., Plano, TX (US)

( * ) Notice: Subject to any disclaimer, the term of this patent is extended or adjusted under 35 U.S.C. 154(b) by 1442 days.

(21) Appl. No.: 11/831,082

(22) Filed: Jul. 31, 2007

(65) Prior Publication Data
US 2009/0032072 A1 Feb. 5, 2009

(51) Int. Cl.
*B08B 3/12* (2006.01)

(52) U.S. Cl.
USPC .......................................... 134/182

(58) Field of Classification Search
USPC ............. 15/3.14, 3.15; 405/119; 99/535, 536; 134/60, 61, 63, 104.2, 104.3, 104.4, 134/133, 182
See application file for complete search history.

(56) References Cited

U.S. PATENT DOCUMENTS

| 85,405 | A | | 12/1868 | Sherwin |
| 592,735 | A | * | 10/1897 | Jones ........................... 204/242 |
| 1,230,980 | A | | 6/1917 | Auld |
| 1,736,813 | A | | 11/1929 | Zuckerman |
| 2,160,893 | A | * | 6/1939 | Newsom .................... 206/521.8 |
| 2,216,498 | A | | 10/1940 | Muir |
| 2,228,192 | A | | 1/1941 | Arthur |
| 2,292,143 | A | * | 8/1942 | Meagher ........................ 15/3.15 |
| 2,572,098 | A | | 10/1951 | Baldwin |
| 2,983,389 | A | * | 5/1961 | Trautmann ...................... 108/31 |
| 3,865,563 | A | | 2/1975 | Wright |
| 4,063,565 | A | | 12/1977 | Edwards |
| 4,759,841 | A | | 7/1988 | Flodin |
| 5,257,740 | A | * | 11/1993 | Prew et al. ...................... 241/20 |
| 5,293,888 | A | | 3/1994 | Avelis et al. |
| 5,413,131 | A | | 5/1995 | Medlock |
| 5,571,408 | A | * | 11/1996 | Rising ...................... 210/167.29 |
| 5,833,868 | A | | 11/1998 | Bajema |
| 6,082,382 | A | | 7/2000 | Buska et al. |
| 6,112,429 | A | | 9/2000 | Mitchell |
| 6,213,308 | B1 | | 4/2001 | Bajema |
| 6,293,407 | B1 | | 9/2001 | Bajema |
| 6,514,349 | B1 | * | 2/2003 | Meldrum .......................... 134/1 |
| 6,584,991 | B1 | | 7/2003 | Ries |
| 2005/0092194 | A1 | * | 5/2005 | Bajema et al. .................. 99/537 |
| 2005/0253361 | A1 | * | 11/2005 | Bouwkamp ................ 280/441.2 |
| 2007/0000768 | A1 | | 1/2007 | Cauley et al. |

FOREIGN PATENT DOCUMENTS

RU 2037589 C1 6/1996

* cited by examiner

*Primary Examiner* — Michael Barr
*Assistant Examiner* — David Cormier
(74) *Attorney, Agent, or Firm* — James R. Gourley; Colin P. Cahoon; Carstens & Cahoon, LLP (57) ABSTRACT

The present invention discloses a washer for washing produce such as potatoes. In one aspect, a debris removal section removes debris, such as rocks, and a sloped serpentine flume is used to gravity feed the produce through a serpentine flow path to remove the surface dirt and loosen any embedded dirt. The produce can be optionally routed to a spray washer to remove embedded dirt.

22 Claims, 5 Drawing Sheets

COMPACT WASHING FLUME SYSTEM

BACKGROUND OF THE INVENTION

1. Technical Field

The present invention relates to a fluid-containing apparatus for washing foreign matter, such as dirt, from produce, such as potatoes and the like, after the produce has been harvested.

2. Description of Related Art

Agricultural produce, such as potatoes, requires washing after harvest and prior to further processing or packaging. Washing produce, particularly potatoes, requires careful handling, because the produce is quite delicate and subject to bruising. Various types of washing devices have been used to wash potatoes after harvesting. Sometimes the potatoes are washed by spray nozzles as the potatoes are conveyed down a line. Absent sufficient pre-soaking, spraying with nozzles alone fails to efficiently remove dirt, especially dirt embedded in the eyes of the potatoes. Consequently, much greater amounts of water must be used and far more nozzles are required without sufficient pre-soaking. To overcome this deficiency, previous systems have used large, permanent structures filled with water with some type of agitating device to provide a pre-soak wash prior to spraying. Such structures are expensive, and require intense maintenance to remove the dirt and rocks that accumulate on the bottom. Further, such systems are not typically "first in first out," meaning that the potatoes randomly enter and exit the pre-soaker. Additionally, the agitating device is subject to routine failure because of the rock and dirt environment it is subject to. Consequently, such systems fail to efficiently and continuously remove both rocks and floating debris. Accordingly, a need exists for an improved apparatus and method for washing produce, such as harvested potatoes, in a more efficient manner.

One solution to washing produce is exemplified by U.S. Pat. No. 5,413,131 ("the '131 patent") which discloses a washer for buoyant produce, such as radishes. The '131 patent discloses a wash tank having baffles placed across the entire width of the tank. The baffles are oriented as alternating from being mounted to the floor of the tank extending upward and mounted from the top of the tank and extending downward, below the water level. The baffles are thereby offset from one another along the internal length of the tank so that essentially every other baffle is an upper baffle and in between each of the upper baffles is a lower baffle. The nozzles are directed in a downward position and the spray discharge produces a strong, downward current that forces buoyant produce completely under water so the produce can move underneath the upper baffles. The buoyant produce then floats up and over the lower baffle before being again subjected to a strong, downward current from another set of spray nozzles.

There are several problems with this type of prior art washer. First, the water from the spray nozzles fails to directly contact the produce. In fact, because the produce is forced under water, there is a low statistical chance for the spray to directly engage the outer periphery of the produce and the standing water actually protects dirt on the produce from the spray. Consequently, it fails to address the issue of removing dirt embedded in produce including the removal of dirt from the eye of a potato. Because the sprays function like eductors to move the produce through the washer, the prior art washer disclosed in the '131 patent is very energy inefficient.

Another problem with this prior art washer is that it fails to work well for heavier than water produce, such as potatoes. While the density of the fluid could be adjusted to increase the relative buoyancy of the potatoes, this is an additional expense, and the additive could impart undesirable flavor components to the potato. Further, such adjustment can introduce waste disposal issues. The washer in the '131 patent also requires an extensive and complex array of nozzles which must be manually adjusted prior to start up. Consequently, a need exists for an improved produce washer that is capable of efficiently washing buoyant or non-buoyant produce, such washer should minimize the amount of water consumed, and also minimize the number of moving parts required.

SUMMARY OF THE INVENTION

The present invention, in one embodiment, is a washer comprising a hydrosorter or debris removal section, a serpentine flume, and a spray washer. In one aspect, the debris removal section having a transverse, upwardly facing slope that promotes rock removal is situated upstream of a serpentine flume. In one aspect, the debris removal section further comprises a skimmer to promote removal of lighter material such as vegetation. In one embodiment, a single or multi-level serpentine flume comprises a plurality of flume wash channels wherein said flume wash channels are defined by a plurality of impervious baffles that extend transversely across the flume from alternate sides. In one aspect, the baffles extend from the bottom of the flume and above the water line. Water and potatoes are gravity-fed through the serpentine flume. The serpentine flume thereby creates a horizontal serpentine flow path that can be used to more efficiently wash potatoes. In one aspect, each side of each baffle comprises an angled gusset where the baffles are mounted to the side of the flume. A spray washer supplying pressurized spray through a plurality of nozzles can be used to remove any embedded dirt that was loosened in the serpentine flume. The above, as well as additional features and advantages, will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 2b is a side view of the debris removal section depicted in FIG. 2a;

FIG. 3b is a side view of the top serpentine flume depicted in FIG. 3a;

DETAILED DESCRIPTION

Figure 1:
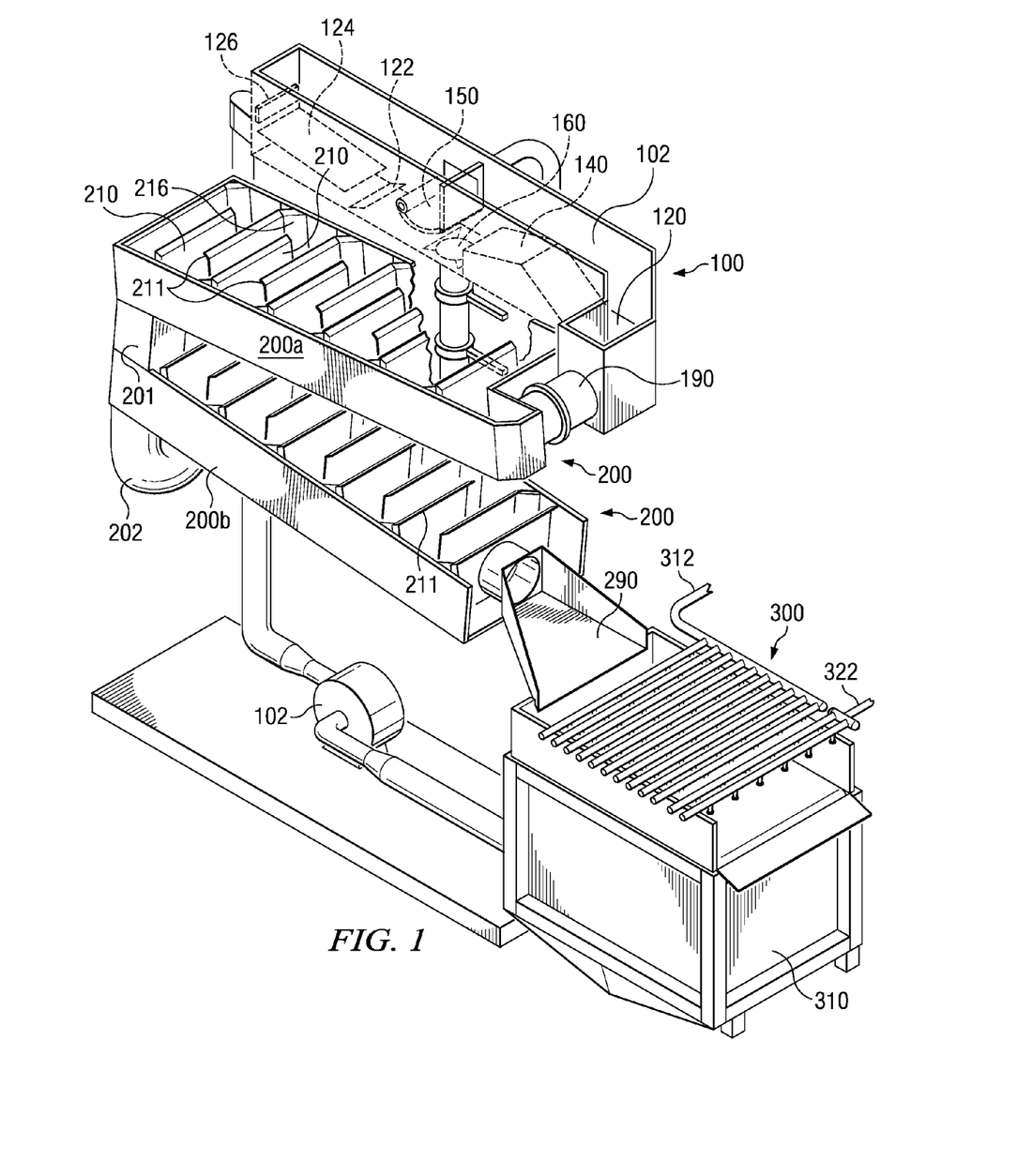
FIG. 1 is a perspective view depicting the washer in accordance with one embodiment of the present invention.
Figure 2A:
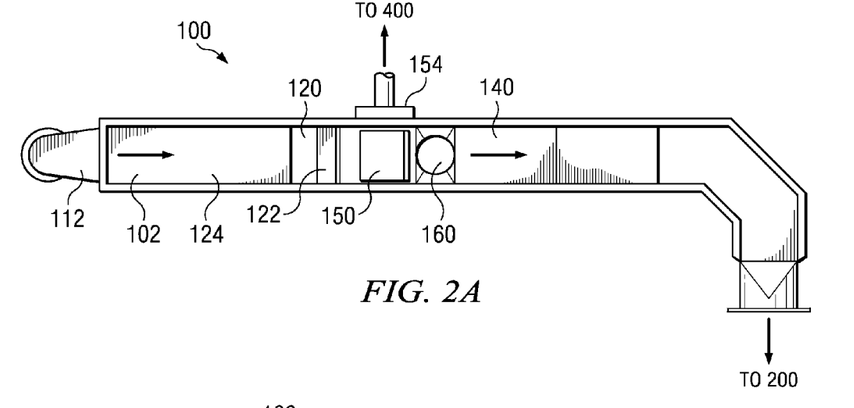
FIG. 2a is a top view of the debris removal section according to one embodiment of the present invention.
Figure 2B:
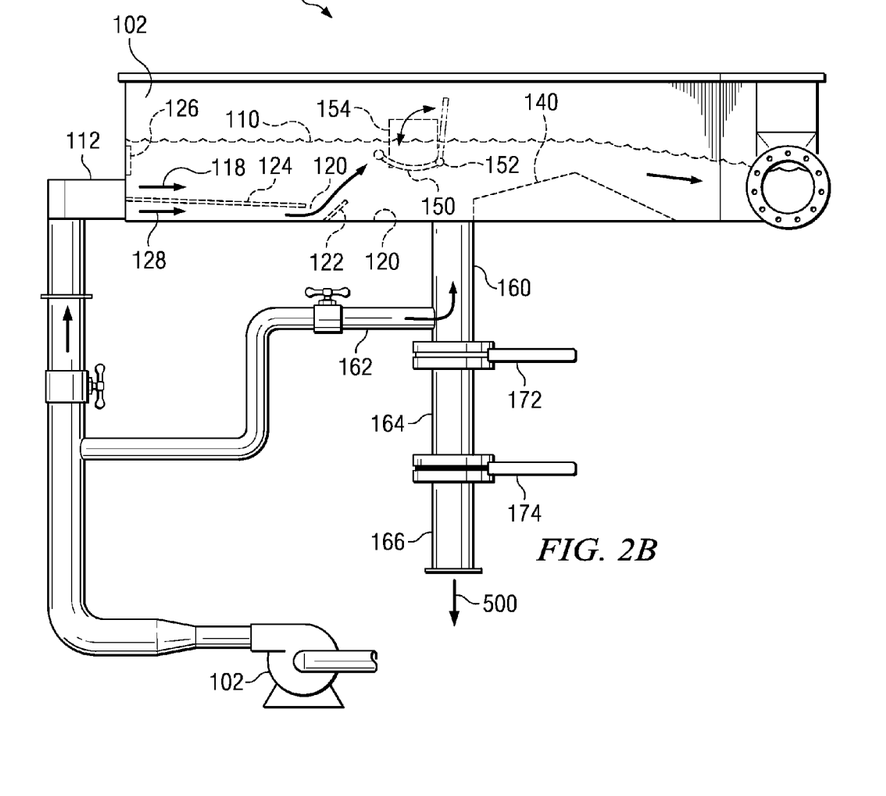

FIG. 1 is a perspective view depicting a washer in accordance with one embodiment of the present invention. As shown, the washer comprises a debris removal section 100 upstream of a bi-level, serpentine flume 200 followed by a spray conveyor 300. In the debris removal section 100, heavy debris is removed by a debris discharge device or rock trap 160 and lighter debris is removed by a skimmer 150. FIG. 2a is a top view of the debris removal section according to one embodiment of the present invention. FIG. 2b is a side view of the debris removal section depicted in FIG. 2a. Like numerals represent like elements throughout the specification. Referring to FIGS. 1, 2a, and 2b, a pump 102 routes water to the debris removal section 100 through an inlet 112 in sufficient quantity to convey the potatoes through the debris removal section 100. In one embodiment, between about 1.0 and about 0.2 and more preferably between about 0.7 and about 0.2 gallons per minute are pumped from in the inlet 112 for each pound of potato per minute that is routed to the serpentine flume 200. Potatoes can enter the top of the upstream portion 102 and are immersed below the water level 110 via gravity.

In one embodiment a downward sloping false bottom 124 divides the incoming flow into top jet(s) 118 and bottom jet(s) 128. In one embodiment, a vertically adjustable gate 126 can be used to adjust the flow from the top jet(s) 118. In one embodiment between about 10% and about 100% of the inlet 112 flow is routed through the top jet(s) 118, with the remainder being routed to the bottom jets(s) 128. Typically about 50% of the inlet 112 flow is routed to the top jet(s) 118. The potatoes are pushed by flow produced from the jets 118 128 across the rock trap 160. In one embodiment, a lip 122 can be used to direct water from the bottom jet 128 upwards and just upstream of the skimmer 150 thereby directing light debris into the skimmer. In one embodiment, the lip 122 comprises an angle of between about 45 degrees and about 90 degrees from the bottom 120 of the debris removal section 100. In one embodiment, the lip 122 is adjustable in the horizontal direction and can be moved to as needed to adjust the vertical flow vector emanating from the bottom jet 128.

In one embodiment, a skimmer 150 is mounted just upstream of the rock trap 160 to remove any floating debris through the skimmer outlet 154. In one embodiment, an adjustable skimmer 150 is pivotally mounted about a hinge 152 so that the skimmer can be adjusted to an optimal depth which can vary based upon the density of the potato being washed. A roller rotating in the clockwise direction can be provided at the distal end of the skimmer to direct grass and other debris into the skimmer. In one embodiment, depending upon the desired level of skimming, between about 5% to 75% and typically 50% of the water from the inlet 112 is routed to the skimmer outlet 154 and can be sent to a filtration system 400 as described in more detail below. A side shield (not shown) can cover the portion of the skimmer outlet 154 below the skimmer 150 to ensure only the water above the skimmer exits through the skimmer outlet 154.

In one embodiment, the rock trap 160 is mounted immediately upstream of the elevated flume bottom 140. As used herein, an elevated flume bottom 140 is a flume bottom downstream of the rock trap 160 that has a higher elevation than the flume bottom 120 upstream of the rock trap 160. In one embodiment, the elevated flume bottom 140, downstream of the rock trap 160 comprises an upwardly facing slope. In one embodiment, the upwardly facing slope is in the transverse direction. Heavy debris, such as rock, is unable to traverse up the elevated bottom 140 and is therefore gravity fed into the rock trap 160.

In one embodiment, water is also pumped into the flume 100 from the rock trap 160 through an inlet 162 mounted to the rock trap 160. Water pumped through the inlet provides an upward flow vector and permits potatoes to overcome the elevated flume bottom 140 as the potatoes are directed downstream and towards the serpentine flume 200. A sufficient water flow from the inlet 162 can be used to ensure that potatoes do not fall into the rock trap 160. For example, in one embodiment, between about 100 gpm and about 300 gpm can be used to produce the requisite upward flow vector in an 8-inch diameter trap 160.

In one embodiment, the rock trap 160 comprises a double valve dump system. The double valve dump system comprises a first movable valve 172 and a second movable valve 174. Both movable valves 172 174 are normally in the closed position. When desired, the first valve 172 can be opened just long enough to permit rocks that have accumulated on the first valve 172 to fall into the next section of pipe 164 where the rocks then rest upon the second movable valve 174. The rocks from section 164 can then be removed by opening the second movable valve 174 while the first movable valve 172 remains closed to permit the rocks to fall below the pipe 166 to a disposal location 500. This double-valve dump system advantageously minimizes water loss because the section of pipe 164 can be full of water when the first movable valve 172 is opened to permit the rocks to drop into the section 164 below. Because the section 164 is full of water when the movable valve 172 is open, water continues to flow upward through the rock trap from the inlet 162, but heavy debris such as rocks fall into the section 164 below the first movable valve 172. In addition to the double-valve dump system described above, the rock trap 160 can also comprise a basket mounted at numeral 164. Alternatively, there is only a single movable valve 172 and the valve is manually operated as needed. Other ways to remove the rocks can also be used including a carousel or a conveyor (not shown) that is submerged and captures the rocks below the opening 160. The conveyor can be enclosed and can have the same water level 110 as the flume.

Upon passing the elevated flume bottom 140, the potatoes are routed towards the serpentine flume 200. Potatoes are gravity-fed through the serpentine flume 200, where dirt on the outer surface of the potatoes is removed and the dirt embedded in the eyes of the potatoes is substantially loosened.

As best shown by FIG. 1, the serpentine flume 200 comprises a bi-level flume having a top flume 200a and a bottom flume 200b. Such configuration advantageously provides for a smaller footprint and permits the present invention to be more compact and truck-mounted. Of course, such embodiment is provided for purposes of illustration and not limitation. One or more levels can be used in accordance with the scope and spirit of the present invention.

Figure 3A:
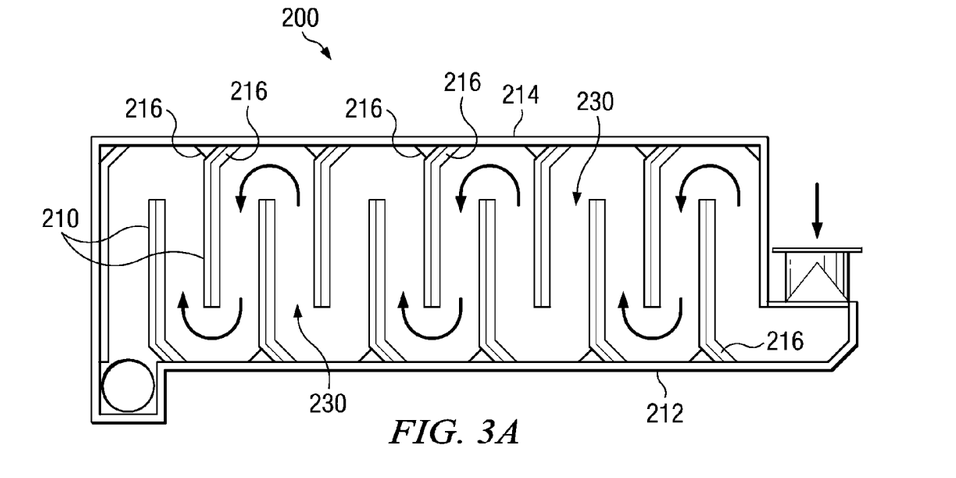
FIG. 3a is a top view of a top serpentine flume in accordance with one embodiment of the present invention.

FIG. 3a is a top view of a top serpentine flume in accordance with one embodiment of the present invention. Referring now to FIGS. 1 and 3a, the serpentine flume 200 comprises a plurality of baffles 210 that extend transversely across the serpentine flume 200 from alternate sides 212 214. Such configuration creates a plurality of flume-wash channels 230 defining a serpentine flow path. In one embodiment, the serpentine flow path created by the alternating baffle configuration advantageously provides a nozzleless washing section.

In one embodiment, the flume channel defined as the distance between adjacent baffles 210 is at least two times the maximum length of the product to prevent the product from stalling in the corners. In one embodiment, the channel width is between about two and about five times the maximum length of the product. Consequently, if the maximum length of a potato is 6 inches, then the channel width should be at least 12 inches.

In one embodiment, each 180 degree U-shaped turn, defined as the portion of the flow path surrounding the distal end of each baffle 210 comprises a pair of 90 degree blunt turns with gussets 216 in the corners to prevent the product from accumulating in the corners. In one embodiment, the width of the gusset 216 is sized to be equal to or greater than the average diameter of the item being washed. For example, if the average diameter of a potato is 3 inches, the width of the gusset 216 is at least 3 inches. Such length will beneficially prevent potatoes from becoming wedged in a corner formed between the baffle and the side of the serpentine flume. In one embodiment, one or more of the flume baffles 210 further comprises one or two 90 degree mitered corners or gussets 216. In one embodiment, each gusset 216 comprises two 45 degree angles in proximity to its respective side 212 214 and a baffle 210. In one embodiment, there are no rounded corners in the serpentine flow path 230. The inventors have discovered that mitered corners advantageously promote dirt removal as potatoes navigate the serpentine flume 200. The mitered corners 216 facilitate the frictional forces exerted on the dirt on the product or potato surface. These frictional forces facilitate removal of the dirt on the outer surface of the potato and further help to loosen the dirt in the eyes of the potato.

Frictional forces of mitered corners 216 can be objectively measured by reference to the equivalent length of pipe required to produce such frictional losses. It is well known in fluid mechanics that flow through a trough can cause a reduction in the static head, which may be expressed in terms of velocity head. Stated mathematically, $$H_L = K * \frac{v^2}{2g}$$

where
$H_L$=head loss
v=velocity
g=gravity, and
K=Resistance coefficient.

The resistance coefficient K in the equation therefore, is defined as the velocity head lost due to the resistance from a valve or a fitting (e.g. a mitered corner). Further, the same head loss in a straight pipe can be expressed by the Manning equation $$H_L = \left(f\frac{L}{D}\right)\left(\frac{v^2}{2g}\right).$$

It follows that $$K = \left(f\frac{L}{D}\right),$$

where
f=friction factor (calculated by methods well known in the art)
The ratio $$\frac{L}{D}$$

is the equivalent length in pipe diameters of straight pipe that will cause the same pressure drop as a valve or fitting under the same flow conditions. Consequently, it has become common in fluid dynamics to compute pressure drops from frictional losses from equivalent lengths expressed as the $$\frac{L}{D}$$

ratio.

Figure 4:
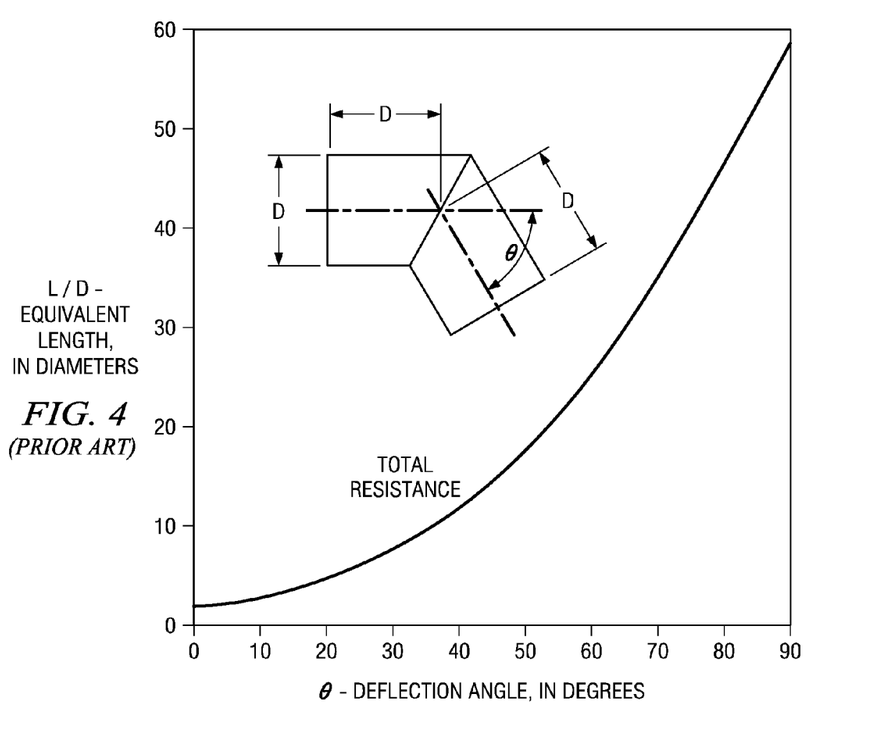
FIG. 4 is a prior art graphical representation depicting the equivalent length based on the deflection angle of a mitered bend.

FIG. 4 is a prior art graphical representation depicting the equivalent length based on the deflection angle of a mitered bend. Referring to the "total resistance" curve in the chart, the equivalent length in pipe diameters of a 45 degree mitered bend is about 15 diameters. A 90-degree angle, on the other hand, is nearly 4 times that number. As evidenced by the chart in FIG. 4, the greater the turn, the greater the friction loss. Consequently, a serpentine flume utilizing a 180 degree turn from two 90 degree angles will have greater friction loss than four 45 degree angles.

As those skilled in the art will understand, the equivalent length would actually be calculated based upon a hydraulic diameter, which is a commonly used term when handling flow in non-circular channels. The discussion above related to equivalent length is provided for purposes of explaining the frictional energy that is efficiently imparted to the potatoes to help clean the dirt from the outer surfaces of the potatoes. One objective of the present invention is to use fittings, flow, and surface configurations the provides higher frictional losses because its believed that such losses facilitate cleaning of the potato surfaces from the potato to potato interaction. Consequently, in one embodiment, the sides and baffles of the serpentine flume can be lined with brushes and/or the surfaces can be roughened.

An additional advantage provided by the present invention is that as the potatoes navigate the serpentine flume 200, the potatoes rub together and produce additional friction, which further removes the dirt from the outer surfaces of the potato and can help to loosen the dirt embedded in the eyes of the potato. Consequently, the design of the present invention provides enhanced washing of potatoes at relatively high potato to water ratios.

Referring back to FIG. 1, another advantage of the present invention is the controlled potato accumulation that occurs at the mitered corners 216 of the serpentine flume 200. Such accumulation provides better contact between the potatoes and permits the potatoes to rub against and thereby clean the surface dirt off of one another. Rounded corners are less effective than mitered corners 216 because mitred corners result in the potato accumulation or stalling at the mitered corners 216. Consequently, in one embodiment, rounded corners are avoided and the baffles 210 fail to have rounded corners where the baffles are attached to the side 212 214 of the serpentine flume. While the mitered corners 216 permit potato accumulation in the corners, there is still sufficient movement such that the potatoes contact each other and rub the dirt off of their respective surfaces. Its this potato to potato contact provided by the relatively high potato to water ratio as opposed to potato to water contact that provides for the efficient surface cleaning of the potatoes in accordance with the present invention.

Upon exiting the flume, the potatoes have virtually no dirt remaining on the surface and the dirt remaining in the eyes of the potatoes is substantially loosened. Further, because no moving parts are in the serpentine flume 200, there is less maintenance and less potential to damage to potatoes. Consequently, the present invention provides aggressive scrubbing with less bruising of the potato.

In one embodiment, the serpentine flow path coupled with the mitered corners 216 provide a compact flume design that is relatively portable and can be placed on a much smaller footprint than prior art pre-soaking devices. Furthers as exemplified by FIG. 1, the flume can be optionally placed in a multi-level configuration to further reduce the footprint required.

Figure 3B:
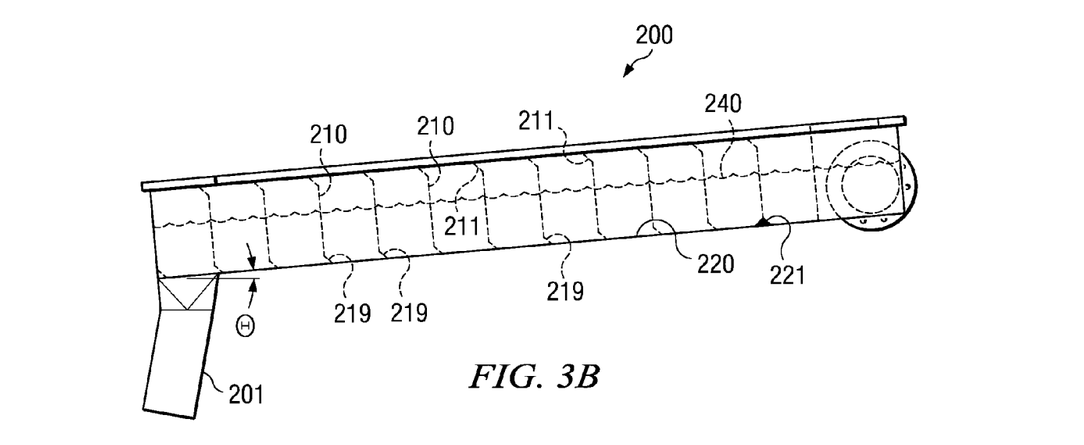

FIG. 3b is a side view of the top serpentine flume depicted in FIG. 3a. As best shown by FIG. 3b, each baffle 210 is attached to the flume bottom 220 and each baffle extends up above the water level 240. The serpentine flume 200 is sloped so as to provide sufficient head to permit the potatoes to gravity-feed through the serpentine flow path created by the alternating baffle configuration. In one embodiment, the slope Θ is between about 1-degree and about 30-degrees and more typically about 5 degrees for potatoes. A sloped serpentine flume advantageously promotes rolling and tumbling of the product. The slopes will vary based upon the product being washed.

In one embodiment, the baffles 210 also comprise a sloped portion 219 leaning downstream to lower drag in the flume and prevent potatoes from becoming wedged in a corner that would otherwise exist between the baffle 216 and the flume bottom 220. The sloped portion 219 of the baffle promotes potato flow through the serpentine flume 200. In one embodiment, the sloped portion 219 of the baffle extends the entire length of the baffle 210. In one embodiment, the length of the sloped portion 219 as seen in cross-section in FIG. 3b, is substantially the same as the average length of the produce being washed. For example, if potatoes being washed have an average diameter of 3 inches, the length of the sloped portion 219 is 3 inches. In one embodiment, the angle between the sloped portion 219 and the flume bottom 220 is between about 45 and 60 degrees. In one embodiment, bottom of the baffle can be backfilled 221 at the baffle bottom on the downstream side of the baffle 216 for sanitary reasons. During operation, the flow of potatoes and water around the baffles can cause the baffles to vibrate which can lead to fatigue. Consequently, in one embodiment, one or more baffles comprise an angled top portion 211 to stiffen the baffle 216.

Figure 3C:
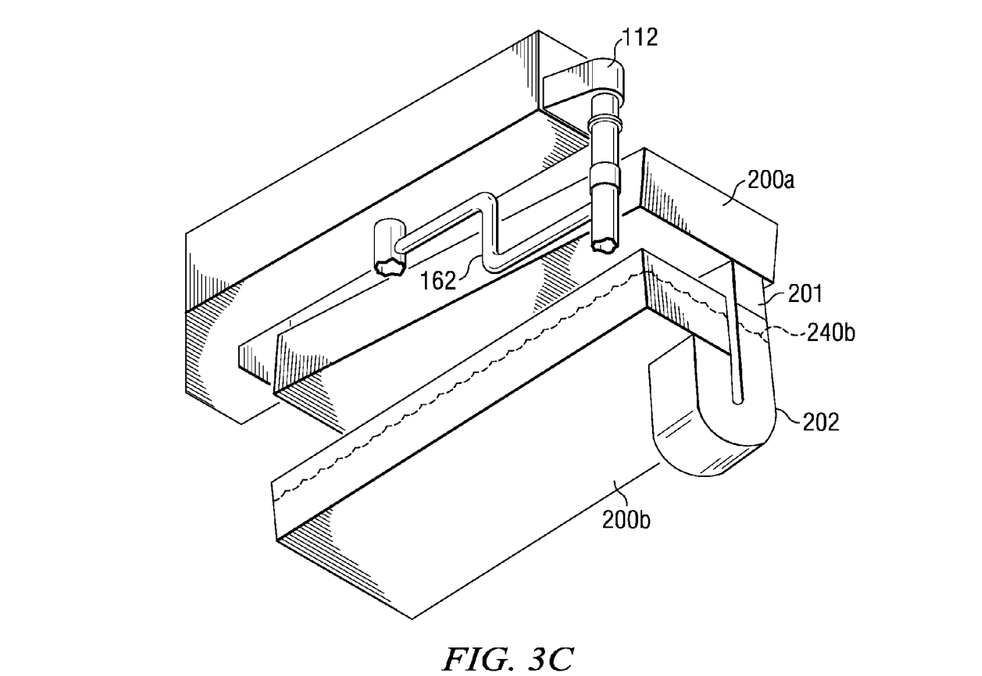
FIG. 3c partial bottom rear perspective view of the debris removal section and bi-level serpentine flume in accordance with one embodiment of the present invention.

FIG. 3c is a partial bottom rear perspective view of the bi-level serpentine flume in accordance with one embodiment of the present invention. Referring to FIGS. 3b and 3c, the top serpentine flume 200a is in hydraulic communication with the bottom serpentine flume 200b. Thus, potatoes can be gently transferred from the top flume 200a through a duct 201 and into a water-filled J-trap 202 and into the bottom flume 200b and thereby avoid bruising. The water level 240b ensures that the J-trap 202 is filled with water and permits the gentle transfer of potatoes between multiple levels of a serpentine flume.

Figure 3D:
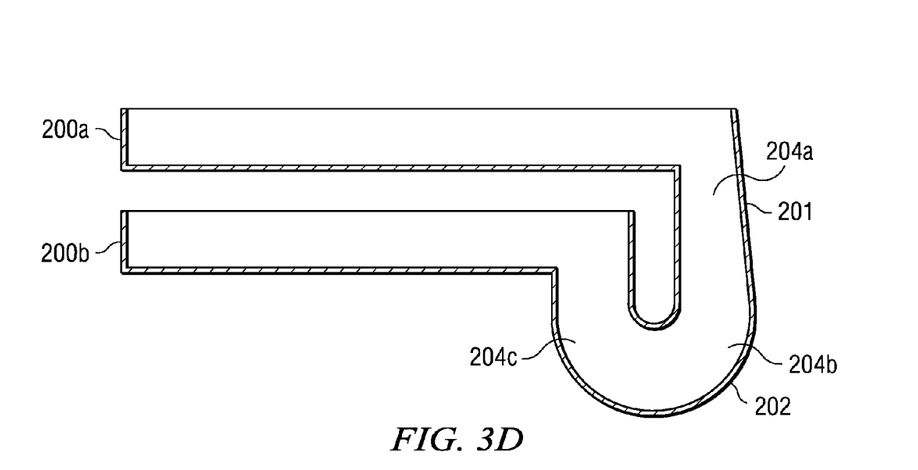
FIG. 3d is a rear end view of the bi-level serpentine flume in accordance with one embodiment of the present invention.

FIG. 3d is a rear end view of the bi-level serpentine flume in accordance with one embodiment of the present invention. In one embodiment, the J-trap comprises an increasing diameter as flow moves downstream. For example, in one embodiment, the duct 201 comprises a diameter of about 10-inches at numeral 204a where the duct 201 connects with the top serpentine flume 200a. In one embodiment, the duct 201 widens to about 10½ inches near numeral 204b and widens further to 11-inches at numeral 204c as it enters the bottom of the bottom serpentine flume 200b. Such widening advantageously promotes flow and prevents product plugging.

Multiple levels of a serpentine flume can be provided to minimize the footprint of the system and to facilitate cleaning as necessary. For example, different soil types can require more or fewer flume channels according to the degree of adhesion of the soil to the potato surface. Stickier soils having a higher clay content can require more flume channels than potatoes harvested from looser, sandy soils. Consequently, it may be desirable to have multiple serpentine flume levels for potatoes that are harvested in higher clay content soils.

Referring back to FIG. 1, the serpentine flume 200 can terminate in a funnel shaped flume 290 and the potatoes leaving the serpentine flume 200 can be routed towards a spray washer 300 where pressurized water emanating from a plurality of spray nozzles mounted on a plurality of spray bars removes any dirt remaining in the eyes of the potatoes. The pressure utilized will depend on upon the fragility of the specific item being cleaned. In one embodiment, the pressurized water sprayed on potatoes is between about 2 bar and about 3 bar. Use of recycled water at higher pressures can wear out nozzles and therefore may be less desirable. The potatoes can move on brushes or rollers below the spray bars. Of course, any suitable washer 300 including, but are not limited to, brush washers, barrel washers, and roller washers, all of which are well known in the art can be used. Because little or no dirt remains on the outer surface of the potatoes exiting the serpentine flume 200, the present invention permits use of an inexpensive brushless spray washer 300. In one embodiment, the spray washer 300 comprises one or more spray nozzles in a drum. Upon leaving the spray washer 300, the potatoes are ready for further processing.

While the water used in the nozzles of the spray washer 300 can come entirely from either a recycled water source 312, or a fresh water source 322, in one embodiment, at least one of the last spray bar manifolds comprises water from a fresh water supply 322. In one embodiment, recycled water 312 is used in all but the last two manifolds and the last two manifolds uses fresh water 322. Water sprayed from the nozzles onto the potatoes can drain into a reservoir 310 beneath the spray washer 300 and water from this reservoir can be sent to a filtration system (discussed below).

Figure 5:
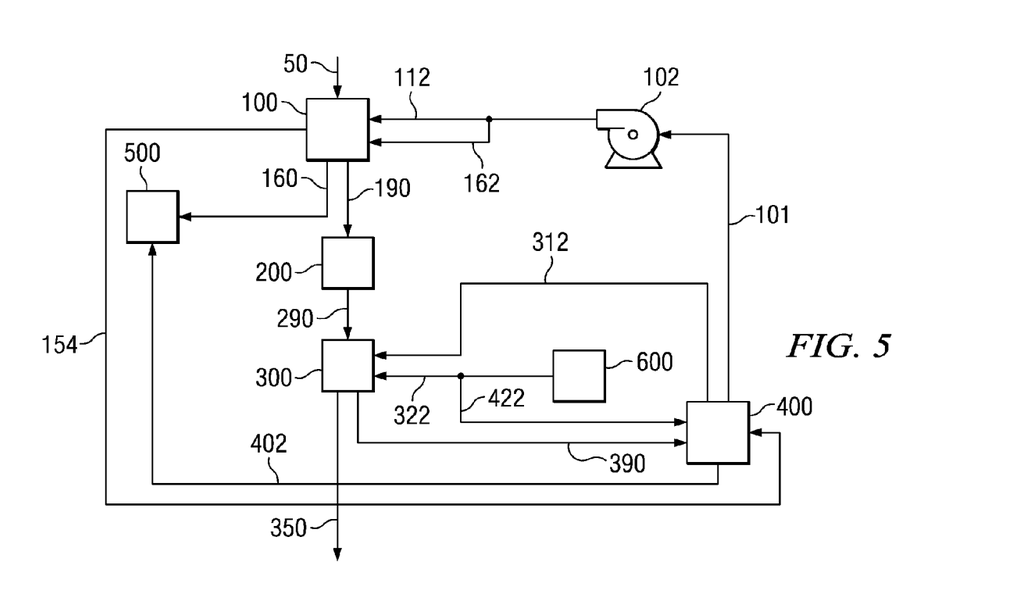
FIG. 5 is a schematic representation of one embodiment of the present invention.

One advantage of the present invention is that it provides an efficient way to wash potatoes with very little water consumption. FIG. 5 is an overall schematic representation depicting one embodiment of the present invention. Harvested potatoes 50 can be routed by a conveyor or other suitable means into a hydrosorter or other debris removal section 100 where recycled water 101 is discharged by a pump 102 through inlet 112. The recycled water thereby propels the potatoes towards the serpentine flume 200. Hydrosorters, similar to those disclosed in U.S. Pat. No. 6,213,308 or 6,293,407, both assigned to the same assignee as the present invention, can be used as a debris removal section in accordance with one embodiment of the present invention. Heavy debris, such as rock, exits through a rock trap 160 to a disposal location 500 and lighter debris exits through the skimmer outlet 154 where it is routed to a filtration system 400. A filtration system 400, similar to that described in U.S. Pat. No. 5,833,868, assigned to the same assignee as the present invention, can be used.

Potatoes can then exit 190 the debris removal section 100 and enter the serpentine flume 200 where the outer potato surfaces are washed as the potatoes are gravity fed through the baffle arrangement. The potatoes and water can exit the serpentine flume 200 through a funnel-shaped flume 290 into a suitable spray washer 300. The spray washer 300 can use recycled water 312 from a filtration system 400, fresh water 322 from a fresh water supply 600, or combinations thereof to remove the dirt loosened from the eyes of the potatoes. The resultant water 390 comprising water from the serpentine flume 200 and from the recycled 312 or fresh water 322 used in the spray washer 300 is routed back the filtration system 400 for re-use. A muddy waste stream 402 from the filtration system 400 can be sent to a disposal location 500. As shown by FIG. 5, the only fresh water being utilized in the present invention is an optional fresh water spray at inlet 322 and a make-up stream 422 to the filtration system. The make-up stream 422 can be used to replace water lost in the muddy waste stream 402 and to a lesser extent to replace any water lost through the rock trap 160, and/or replace any water that remains on the washed potatoes 350 or that is lost through evaporation.

Example

A washer was constructed similar to that depicted in FIG. 1. The debris removal section 100 had a length of about 14 feet, a width of about 1 foot, height of about 2½ feet, and a water level in the debris removal section of about one foot. Water flowed through the inlet 112 at about 400 gallons per minute and through inlet 162 at 200 gallons per minute. About half of the inlet 112 was routed through the top jets 118 and the other half was routed through the bottom jets 118. About 300 gpm of water exited the debris removal section 100 at the skimmer. The double-valve dump system was activated every 10 to 60 minutes to remove accumulated rocks. About 3 gallons of water is lost with each discharge. The rest of the water, along with the potatoes, were routed towards the serpentine flume 200. 1500 pounds of potatoes per minute were placed into the upstream section 102 of the debris-removal section. At the end of the debris-removal section, the potatoes were routed towards the bi-level, serpentine flume 200. The length of the serpentine flume 200 was approximately 12 feet and the width from the first side to the second side was approximately 4 feet. The serpentine flume 200 had 11 baffles spaced at one-foot increments. The height of the serpentine flume 200 was about 20 inches, and the height of the baffles was about 16 inches. The water level in the flume was about 10 inches. At the end of the top serpentine flume 200, the potatoes were discharged through a ten-inch discharge pipe having a length of about 2 feet into the lower serpentine flume, which had the same approximate construction as the upper serpentine flume 200. After navigating the lower serpentine flume 200, the potatoes were discharged to a potato washer having 10 spray bars, 70 nozzles, and operating at a pressure of 2 bar at 300 gallons per minute total. The eight spray bar manifolds closest the serpentine flume utilized a recycled water stream and the last two spray bar manifolds utilized fresh water. The spray washer 300 provided a finish wash that removed most, if not all, of the dirt remaining in the eyes of the potatoes. Further, the spray washer 300 was able to clear out most potato rot present in the potatoes. No rocks appeared at the spray washer 300. Because the spray washer conveyor comprised a plurality of stainless steel rollers, any rocks which enter the spray washer make very loud, noticeable noises. No such noise was heard.

The water used in this system was cleaned through a hydrosieve to remove the debris, and the water from the spray washer was cleaned with 3 4-inch G Max Cyclones to remove the dirt in a way similar to that disclosed in U.S. Pat. No. 5,833,868. Of the 600 gpm routed to the filtration system, only about 9 gpm were discharged as a muddy waste stream. Consequently, only about 9 gallons were consumed for cleaning 1,500 pounds of potatoes.

The present invention has several advantages over the prior art. The number of moving parts is substantially minimized. For example, the only moving parts in one embodiment of the present invention are the two movable gate valves 172 174, the conveyor (not shown) for dumping potatoes into the debris-removal section, the conveyor below the spray nozzles, and the spray washer 300. Also, due to the design of the rock trap in the debris-removal section 100, there is little build up of dirt, debris, or rocks in this invention. Further, because there are no external mixing devices in the debris-removal section 100 or the serpentine flume 200, there is little bruising of the potatoes. Because there are few moving parts, there are few plugging issues. Moreover, unlike prior art potato washer which use brushes to clean the outside of the potatoes and fail to get the dirt in the eye, the present invention provides an apparatus and method for loosening dirt wedged in the potato eye and removing that dirt from the eye. Due to the way in which the potatoes frictionally engage one another, the present invention is able to provide cleaner surfaces of the potatoes with less soak time than prior art soakers. The present invention also provides a "first in first out" system which provides more uniform and consistent cleaning of the surfaces of the potatoes. The present invention requires a relatively small footprint and, as shown in FIG. 1, the present invention can use multiple levels and are therefore stackable to increase presoak aggressiveness as required by the conditions of the product being washed.

While this invention has been particularly shown and described with reference to a preferred embodiment, it will be understood by those skilled in the art that various changes in form and detail may be made therein without departing from the spirit and scope of the invention.

While the invention is described with respect to potatoes, those skilled in the art would recognize that it could be used for other harvested produce, including but not limited to sweet potatoes, sugar beets, and radishes. The present invention can also be used in a preparation step prior to classifying all kinds of materials. The present invention is not limited to food products and can be used for other materials including but not limited washing gravel and polishing aggregate to separate fines. Further, given the above disclosure, those having skill in the art will understand that other fittings including other mitered angles can be used without departing from the spirit and scope of the claimed invention. Further, the baffle surfaces can be roughened to further enhance potato to potato contact. Additionally, although a bi-level serpentine flume is depicted, such is provided for purposes of illustration and not limitation. One or more levels of a serpentine flume can be used in accordance with the spirit of the claimed invention. Further, a spiraling flume having non-rounded corners that optionally spirals around a piece of equipment or in or outside a building can also be used.

What is claimed is:
1. A flume washer comprising:
   a serpentine flume (200) comprising a plurality of impervious baffles (210) that extend transversely across the flume from alternate sides (212 214) wherein said baffles (210) extend from a flume bottom (220) to above a flume water level (240) and thereby define a serpentine flow path;
   the serpentine flume (200) further comprising a debris removal section (100) upstream of said serpentine flume (200) wherein said debris removal section comprises a bottom (120) and an elevated flume bottom (140), wherein a debris discharge device (160) permits debris to exit said bottom section immediately upstream of said elevated flume bottom (140).
2. The washer of claim 1 wherein said elevated flume bottom (140) comprises a transverse upwardly-facing slope.

3. The washer of claim 1 wherein said debris discharge device (160) comprises a double-valve dump system having a first moveable valve (172) and a second moveable valve (174).

4. The washer of claim 1 wherein at least one of said baffles comprises a bottom sloped portion attached to said flume bottom.

5. The washer of claim 4 wherein said sloped portion comprises a length that is at least equal to an average diameter of a product being washed.

6. The washer of claim 1 wherein said serpentine flume comprises two or more levels.

7. The washer of claim 6 wherein a first level is connected to a second level by a J-trap filled with water to a water level.

8. The washer of claim 1 further comprising a spray washer.

9. A washer comprising:
   a serpentine flume, wherein said serpentine flume comprises a plurality of impervious baffles (210) that extend transversely across the flume from alternate sides (212 214) wherein said baffles (210) extend from a flume bottom (220) to above a flume water level (240) and thereby define a serpentine flow path; and
   a spray washer (300) downstream of said serpentine flume.

10. The washer of claim 9 wherein each impervious baffle (210) further comprises at least one gusset (216).

11. The washer of claim 10 wherein said gusset comprises a width that is at least equal to the average diameter of a product being washed.

12. The washer of claim 9 wherein at least one of said baffles is connected to a side of said serpentine flume by a gusset having two mitered forty-five degree angles.

13. The washer of claim 9 wherein at least one of said baffles comprises a bottom sloped portion attached to said flume bottom.

14. The washer of claim 13 wherein said sloped portion comprises a length that is at least equal to an average diameter of a product being washed.

15. The washer of claim 9 having a channel width that is at least two times the maximum length of a product being washed.

16. The washer of claim 9 having a channel width that is between about two times and about five times the maximum length of a product being washed.

17. The washer of claim 9 wherein said serpentine flume comprises two or more levels.

18. The washer of claim 17 wherein a first level is connected to a second level by a J-trap filled with water to a water level.

19. The washer of claim 9 wherein said serpentine flume comprises no spray nozzles.

20. The washer of claim 9 wherein said serpentine flume comprises no moving parts.

21. The washer of claim 9 further comprising a hydrosorter upstream of said serpentine flume.

22. The washer of claim 9 wherein said alternate sides (212 214) are parallel to a vertical plane and wherein said flume bottom is parallel to a horizontal plane.

\* \* \* \* \*